(12) United States Patent
Johnston et al.

(10) Patent No.: US 10,587,730 B2
(45) Date of Patent: Mar. 10, 2020

(54) ENHANCED TRANSFER OF INFORMATION USING AN INDUSTRIAL PROTOCOL SYSTEM AND METHOD

(71) Applicant: ROCKWELL AUTOMATION, INC., Milwaukee, WI (US)

(72) Inventors: David Allen Johnston, Mentor, OH (US); Elmorris P. Dixon, Willoughby Hills, OH (US); Kendal R. Harris, Mentor, OH (US)

(73) Assignee: Rockwell Automation, Inc., Milwaukee, WI (US)

( * ) Notice: Subject to any disclaimer, the term of this patent is extended or adjusted under 35 U.S.C. 154(b) by 678 days.

(21) Appl. No.: 14/597,811

(22) Filed: Jan. 15, 2015

(65) Prior Publication Data

US 2016/0212241 A1 Jul. 21, 2016

(51) Int. Cl.
*H04L 29/06* (2006.01)
*H04L 29/08* (2006.01)

(52) U.S. Cl.
CPC .......... *H04L 67/42* (2013.01); *H04L 63/0428* (2013.01); *H04L 63/08* (2013.01); *H04L 67/12* (2013.01); *H04L 69/04* (2013.01); *H04L 69/08* (2013.01)

(58) Field of Classification Search
CPC . H04L 67/12; H04L 63/0428; H04L 67/2828; H04L 69/04
See application file for complete search history.

(56) References Cited

U.S. PATENT DOCUMENTS

| 2003/0154308 | A1  | 8/2003 | Tang et al. |
| 2007/0061018 | A1* | 3/2007 | Callaghan .............. G05B 19/05 700/1 |
| 2007/0162957 | A1* | 7/2007 | Bartels .................. G05B 15/02 726/2 |

FOREIGN PATENT DOCUMENTS

| CN | 1577252 A  | 2/2005 |
| CN | 1811637 A  | 8/2006 |
| CN | 1937559 A  | 3/2007 |
| CN | 101375265 A | 2/2009 |

(Continued)

OTHER PUBLICATIONS

European Search Report for EP Application No. 16151397 dated Mar. 21, 2016; 10 Pages.

(Continued)

*Primary Examiner* — Tauqir Hussain
(74) *Attorney, Agent, or Firm* — Fletcher Yoder, P.C.

(57) ABSTRACT

An enhanced transfer of information using an industrial protocol system and method are disclosed. In one embodiment, an industrial automation system includes a serving device communicably coupled with a client device via an industrial data exchange protocol. The client device is configured to generate a service request in accordance with the industrial data exchange protocol, compress the service request, encapsulate the compressed service request in a request packet, and send the request packet to the serving device. The serving device is configured to receive the request packet, decompress the compressed service request, process the service request, gather a service response payload based on the service request, compress the service response payload, encapsulate the compressed service response payload into a response packet, and send the response packet to the client device.

20 Claims, 4 Drawing Sheets

(56) References Cited

FOREIGN PATENT DOCUMENTS

| | | |
|---|---|---|
| CN | 103605342 A | 2/2014 |
| CN | 103905537 A | 7/2014 |
| CN | 103944957 A | 7/2014 |

OTHER PUBLICATIONS

Acromag Inc: "BusWorks 900IP Series 10/100M Industrial Ethernet I/O Modules Technical Reference—EtherNet/IP (TM) 8500-747-A04L000 Introduction to EtherNet(TM)", Dec. 31, 2004 (Dec. 31, 2004), XP055256599, Retrieved from the Internet: URL:https://www.acromag.com/sites/default/files/Acromag_Intro_EthernetIP_747A.pdf.

Chinese Office Action Application #201610027818.1; 6 pages; dated Jan. 1, 2018.

* cited by examiner

ENHANCED TRANSFER OF INFORMATION USING AN INDUSTRIAL PROTOCOL SYSTEM AND METHOD

BACKGROUND

The present disclosure relates generally to the field of industrial automation control systems. More particularly, embodiments of the present disclosure relate to enhancing the performance of transferring information between a server and a client using an industrial data exchange protocol.

Industrial automation devices in an industrial automation control system typically communicate over one or more open or proprietary industrial data exchange protocols. Example industrial data exchange protocols may include the Common Industrial Protocol (CIP™), Modbus®, BACnet™, other CIP networks (e.g., EtherNet/IP™, DeviceNet™, ControlNet™), and the like. Industrial automation devices that communicate using such an industrial data exchange protocol may include serving devices, such as controllers or the like, and client devices, such as workstations, portable computing devices, or the like. The client devices may make requests to the serving devices over a network using the industrial data exchange protocol and the serving devices may respond to the requests by performing functionality, retrieving data, and so forth. At certain times, the client devices may request to read a large amount of data from the serving devices or transfer a large amount of data to the serving devices. As a result, there may be multiple back and forth requests and responses processed by the serving and client devices to transfer all of the data. This may hinder the performance of interaction between the serving and client devices communicating via the industrial data exchange protocol.

BRIEF DESCRIPTION

Certain embodiments commensurate in scope with the originally claimed subject matter are summarized below. These embodiments are intended only to provide a brief summary of possible forms of the techniques. Indeed, the techniques may encompass a variety of forms that may be similar to or different from the embodiments set forth below.

In one embodiment, an industrial automation system includes a serving device communicably coupled with a client device via an industrial data exchange protocol. The client device is configured to generate a service request in accordance with the industrial data exchange protocol, compress the service request, encapsulate the compressed service request in a request packet, and send the request packet to the serving device. The serving device is configured to receive the request packet, decompress the compressed service request, process the service request, gather a service response payload based on the service request, compress the service response payload, encapsulate the compressed service response payload into a response packet, and send the response packet to the client device.

In another embodiment, a non-transitory computer-readable medium storing computer instructions is disclosed. The computer instructions, when executed by a processor, are configured to cause an industrial automation device to function as a serving device and receive a request packet conforming to an industrial data exchange protocol containing a compressed service request from an industrial automation client device, to decompress the compressed service request, to process the service request, gather a service response payload based on the service request, to compress the service response payload, to encapsulate the compressed service response payload into a response packet conforming to the industrial data exchange protocol, and to send the response packet to the industrial automation client device.

In yet another embodiment, a method for operating an industrial automation device includes causing the industrial automation device to function as a serving device and receive a request packet conforming to an industrial data exchange protocol containing a compressed service request from an industrial automation client device, decompressing the compressed service request, processing the service request, gathering a service response payload based on the service request, compressing the service response payload, encapsulating the compressed service response payload into a response packet conforming to the industrial data exchange protocol, and sending the response packet to the industrial automation client device.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
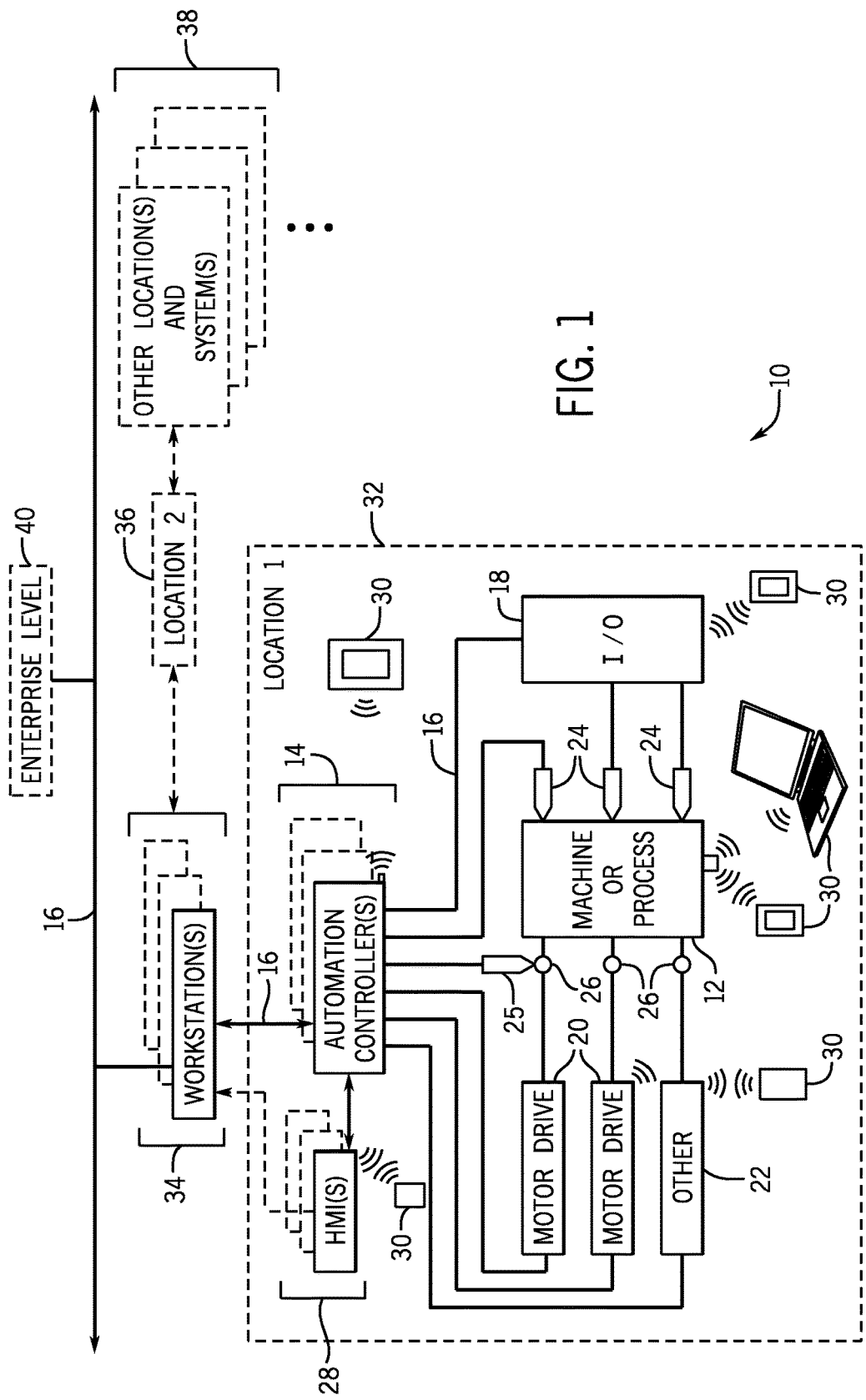
FIG. 1 is a diagrammatical representation of an industrial automation system including networked components and configuration equipment in accordance with embodiments of the present techniques.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. It should be noted that the terms "server" and "serving device" may be used interchangeably herein. Further, the terms "client" and "client device" may be used interchangeably herein.

Present embodiments relate to a system and method for enhancing the performance of information transfer from an industrial automation serving device to an industrial automation client device using an industrial data exchange protocol. In certain embodiments, the protocol may include the open Common Industrial Protocol (CIP™) However, in some embodiments, other industrial data exchange protocols may be used, such as Modbus™, BACnet™, or the like. The present techniques may include using a compression and encapsulation system implemented by both the industrial automation serving devices and client devices. In an embodiment, the system may include a specialized service tailored for the particular industrial data exchange protocol being used. For example, a service request generated by a client device, such as a human machine interface (HMI), workstation, portable computing device, handheld device, and so forth, may be compressed and encapsulated in a CIP packet using the specialized service on the client before being sent to the serving device. In some embodiments, the CIP packet may also be compressed. Also, the CIP packet and/or the compressed service request may be secured before being sent, discussed in detail below.

Then, the industrial automation serving device, such as a controller, may receive the CIP request packet from the client device, decompress the service request and/or the CIP packet, and perform any needed decryption. In some embodiments, the request may be for a large volume of data or the client may desire to move a large volume of data to the serving device. The serving device may determine that the request can be satisfied by locating the desired payload and gathering the desired payload. Once gathered, the serving device may optionally secure the payload by using encryption. Either way, the serving device may then compress the payload and encapsulate the payload in a CIP response packet using the specialized CIP service implemented on the serving device. Also, the CIP response packet may be compressed. Additionally, the serving device may secure the CIP packet and/or the payload. Next, the CIP response packet may be sent to the requesting client. The client may receive the CIP packet and recognize that it is a response to its prior request. Then, the client may process the packet by decompressing the payload and/or CIP packet, performing any needed decryption, accessing the payload, and analyzing and/or storing data in the payload. The benefits of the disclosed techniques include enhancing the performance of the interaction between industrial automation serving devices and client devices communicating over an industrial data exchange protocol by reducing response time and packet size of data on the wire. While the serving and client devices are often referred to in the singular in this discussion, it should be noted that one or both may comprise multiple serving and client devices, respectively.

It may be beneficial to discuss industrial data exchange protocols to provide context to the present disclosure. Various industrial data exchange protocols are employed to support automated manufacturing operations and communications. These can include device protocols, mid-level protocols between the device level and the control level, and upper-level protocols such as Ethernet that has been adapted to communicate via industrial control objects among factories and on to high-level networks such as the Internet. In one specific example of such an industrial data exchange protocol, the Common Industrial Protocol (CIP™) encompasses a comprehensive suite of attributes, messages and services, organized as objects, for the enablement of manufacturing automation application objectives—control, safety, synchronization, motion, configuration and information collection. Further, CIP enables users to integrate these manufacturing applications with enterprise-level Ethernet networks and the Internet. Supported by hundreds of vendors around the world, CIP provides users with a unified communication architecture throughout the manufacturing enterprise. The CIP protocol is an industry standard communication protocol for industrial automation systems. Also, the CIP protocol allows users to benefit today from the many advantages of open networks while protecting their existing automation investments when upgrading in the future. Indeed, since CIP is an open industrial data exchange protocol, it may be easily extended through the addition of objects that provide new functionality.

Through the addition of functionally specialized objects, the CIP protocol provides a coherent integration of control, motion and synchronization, configuration and diagnostics, and safety information. This protocol includes seamless bridging and routing without the added cost and complexity of bridges and proxies. Further, the protocol provides freedom to deploy interoperable, multivendor systems, allowing users to choose best-of-breed products, with the assurance of competitive prices and low integration cost. This includes single, media independent protocol for all network adaptations of CIP—EtherNet/IP™, DeviceNet™, CompoNet™, and ControlNet™ that allows users to select the best network or networks for their application while still minimizing their overall investment in system engineering, installation, integration and commissioning. The CIP protocol also integrates support of Modbus® server devices into the CIP architectures with Modbus translation services for originator devices on CIP; allows devices supporting Modbus TCP and EtherNet/IP to reside on the same TCP/IP network—or even in the same device. Modbus integration is accomplished by the usage of objects to create an abstraction. Modbus is then accessed as if the Modbus devices were native CIP devices.

The CIP protocol enables explicit and implicit messaging. Explicit messaging may refer to point-to-point, request/response (client/server) protocol typically used for unscheduled information messaging. The term "explicit" refers to an address which explicitly defines the path to a specific target object using a path (EPATH) or internal object identifier (IOI). Implicit messaging may refer to a multicast, producer/consumer protocol designed for scheduled data transfer. An "implicit" address is a connection identifier (CID) for a specific object between a client and server or producer and consumer. Explicit messages may be connected or unconnected. Connected, explicit messages include a CID to the target device's message router object and an EPATH (IOI) to the specific target object within the device. An unconnected, explicit message contains only an EPATH (IOI). The explicit messages may be encapsulated in one or more packets to be sent between client and server devices. The packets may include at least a header and data portions. The header may include fields for the source/target address, protocol type, command code, data length, session handle, status, and so forth. The data portion of the packet may include fields for handle, timeout, and common packet format, which is a variable number of address and data items, among other things.

Turning now to FIG. 1, which is a diagrammatical representation of an industrial automation system including networked components and configuration equipment in accordance with embodiments of the present techniques. The industrial automation system is generally indicated by reference numeral 10. Specifically, the automation system 10 is illustrated as including a machine system or process 12 and one or more automation controllers 14 adapted to interface through a network 16 with an input/output (I/O) device 18. It should be noted that such an interface in accordance with embodiments of the present techniques may be facilitated by the use of certain network strategies. Indeed, an industrial data exchange communication protocol may be employed, such as CIP or other CIP derivative (DeviceNet, ControlNet, Ethernet/IP), Modbus, BACnet, or the like, to enable data transfer. Such networks permit the exchange of data in accordance with a predefined protocol, and may provide power for operation of networked elements.

The machine system or process 12 may take many forms and include devices for accomplishing many different and varied purposes. For example, the machine system or process 12 may include a compressor station, an oil refinery, a batch operation for making food items, a mechanized assembly line, and so forth. Accordingly, the machine system or process 12 may include a variety of operational components, such as motor drives 20, electric motors, valves, actuators, temperature elements, pressure sensors, or a myriad of manufacturing, processing, material handling, and other applications 22. Further, the machine system or process 12 may include control and monitoring equipment for regulating process variables through automation and/or observation.

For example, the illustrated machine system or process 12 may include sensors 24 and actuators 26. The sensors 24 may include any number of devices adapted to provide information regarding process conditions. The actuators 26 may include any number of devices adapted to perform a mechanical action in response to a signal from the automation controller 14. The sensors 24 and actuators 26 may be utilized to operate process equipment. Indeed, they may be utilized within process loops that are monitored and controlled by the automation controller 14. Such a process loop may be activated based on process inputs (e.g., input from a sensor 24) or direct operator input received through one or more human machine interfaces (HMIs) 28 that provides an interface to the automation controller 14 and may also communicate via the network 16.

As illustrated, the sensors 24 and actuators 26 may communicate with the automation controller 14 in several ways. For example, the sensors 24 and actuators 26 may communicate with the automation controller 14 via an I/O device 18 by way of the network 16 or the sensors 24 and actuators 26 may be directly connected to the automation controller 14. The I/O device 18 may transfer input and output signals between the automation controller 14 and the machine system or process 12. The I/O device 18 serves as an electrical interface to the automation controller 14 and may be located proximate to or remote from the automation controller 14. Additionally, several I/O devices 18 may be used simultaneously to facilitate an appropriate amount of input and output signal capabilities of the industrial automation system 10. Also, the automation controller 14 may include one or more sensors 25 connected directly to the actuators 26 in order to sense the exact signal sent to the actuators 26 before actuation occurs or right after actuation occurs.

The I/O devices 18 may include input modules that receive signals from input devices such as photo-sensors and proximity switches, output modules that use output signals to energize relays or to start motors, and bidirectional I/O modules, such as motion control modules which can direct motion devices and receive position or speed feedback. In some embodiments, the I/O devices 18 may be located in close proximity to a portion of the control system, and away from the remainder of the automation controller 14. In such embodiments, data may be communicated with remote modules over a common communication link, or network 16, wherein modules on the network communicate via a standard communications protocol. Many industrial controllers can communicate via network technologies such as CIP, Ethernet (e.g., IEEE802.3, TCP/IP, UDP, EtherNet/IP, and so forth), ControlNet, DeviceNet or other network protocols (Foundation Fieldbus (H1 and Fast Ethernet) Modbus TCP, Profibus) and also communicate to higher level computing systems. Further, the I/O devices 18 may include wireless communication circuitry that may enable wireless communication with portable handheld devices 30, the automation controller 14, the HMI 28, the machine system or process 12, and so forth.

The above described components may be located in the same site, plant, factory, etc. (e.g., "location 1" 32). However, the automation controller 14 and/or HMI 28 may be capable of communicating with external workstations 34 and other locations and systems 38 over the network 16 (e.g., CIP). The automation controller 14 may also include wireless communication circuitry that enables wireless communication with external devices and/or systems. For example, the automation controller 14 may wirelessly communicate with workstations 34, other components located in "location 2" 36, and/or other locations and systems 38. The various workstations 34, locations (32 and 36), and other locations and systems 38 may all communicate with one another and data related to each system may be stored at an enterprise level 40 via network 16.

Additionally, in some embodiments, the automation controller's wireless communication circuitry may enable wirelessly communicating with each component (e.g., HMI(s) 28, I/O devices 18, machine system or process 12, motor drives 20, other applications 22, etc.) located in "location 1" 32 from portable handheld devices 30. For example, a field engineer may possess a portable handheld device 30 connected to a wireless network to which the automation controller(s) 14 is also connected. The field engineer may access an industrial automation system web application served by the automation controller 14 in order to interact with the automation controller's 14 content and functionality. Likewise, the field engineer may use the handheld device 30 to communicate with other components in "location 1" 32, such as the HMI(s) 28, the I/O devices 18, the machine system or process 12, the motor drive(s) 20, and/or other applications 22.

In some embodiments, each component (e.g., the automation controller 14, the HMI 28, the I/O devices 18, the machine system or process 12, the motor drive 20, and/or the other applications 22) may be a serving device as they may run one or more server programs (e.g., industrial automation system web applications or other distributed application) that share their resources and/or services with requesting client device(s). In alternative embodiments, the portable handheld devices 30 may be serving devices as they may run one or more server programs that share their resources or services with requesting client devices, such as other portable handheld devices 30 or the HMI 28, the automation controller 14, the motor drive 20, the machine system or process 12, the I/O devices 18, and/or other applications 22.

In some embodiments, the automation controller 14 may be a programmable logic controller (PLC) that ranges in size and capabilities from a PLC including a high performance multi-core microprocessor to a PLC including an ARM processor that utilizes reduced instruction set computing. The latter automation controller 14 may be a portable handheld device 30 such as a smart phone, personal digital assistant (PDA), and so forth, and, as previously discussed, the portable handheld device 30 may be a serving device to which client devices make requests.

Also, in some embodiments, the automation controller 14 may function as a client device when interacting with another automation controller 14 that functions as a serving device. As such, the client automation controller may use the techniques disclosed herein to compress its service request and encapsulate the request in one or more packets (e.g., CIP) using a specialized service. Then, the client automation controller may send the request packets to the server automation controller, which may decompress the request packets, read the request, and gather and compress a desired payload. Next, the server automation controller may encapsulate the payload in one or more packets (e.g., CIP) using its specialized service for the industrial data exchange protocol. As may be understood, the specialized service may contain functionality to execute when the industrial automation device is acting as a client and as a server. After the payload is encapsulated, the server automation controller may send the packet to the client automation controller. The client automation controller may decompress the packets, process the packets, and analyze and/or store payload data.

It should be noted that during compression or encapsulation, the payload and/or packet may be encrypted (e.g., public/private key), signed, hashed, password protected, or some combination thereof, for security purposes. It should be further noted that any industrial automation device functioning as a client and any industrial automation device functioning as a serving device may use the present techniques to increase transmission speed of requests and responses, respectively. Indeed, the present techniques may result in a significant reduction of exchanges between client and serving devices due to the compressed services, thereby improving the responsiveness of the system. For purposes of discussion, the CIP protocol will be referenced as the industrial data exchange protocol (e.g., network) used by the disclosed techniques throughout the rest of this disclosure, although, as mentioned above, it should be understood that other suitable industrial data exchange protocols may be used.

Figure 2:
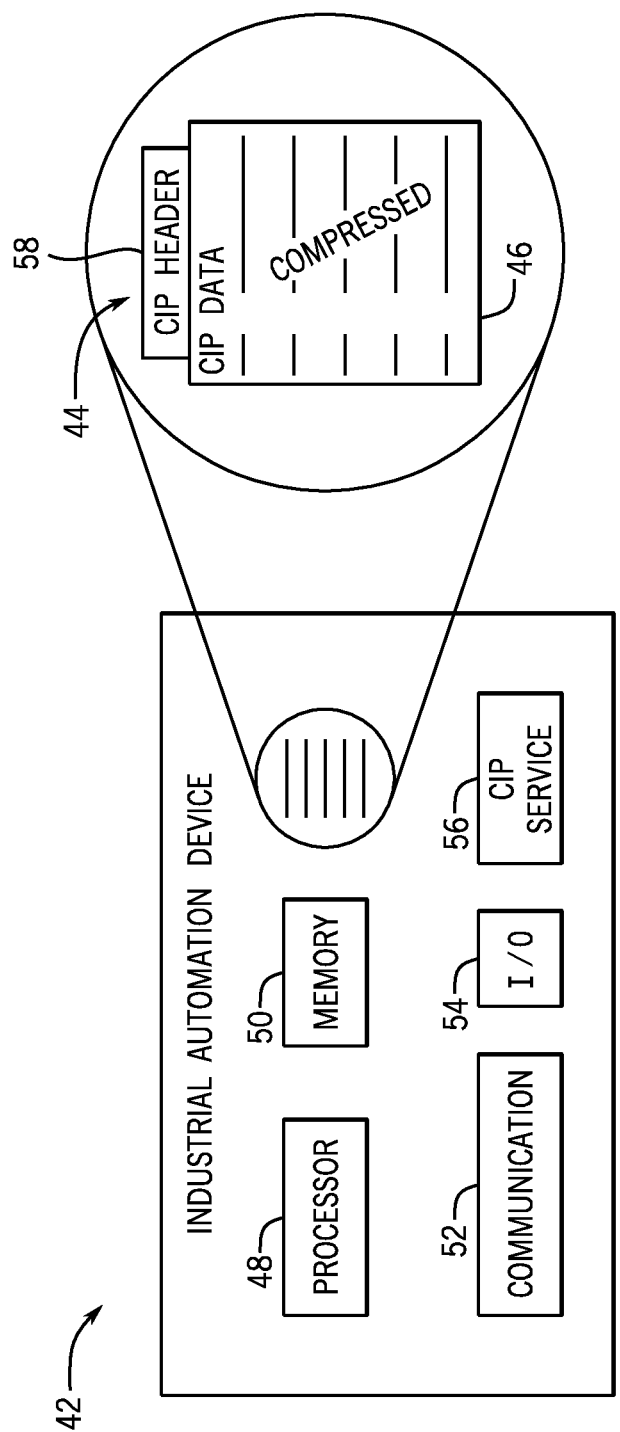
FIG. 2 is a diagrammatical representation of an industrial automation device storing compressed data encapsulated in a Common Industrial Protocol (CIP™) packet in accordance with embodiments of the present techniques.

Accordingly, FIG. 2 is a diagrammatical representation of an industrial automation device 42 storing a CIP packet 44 encapsulating compressed data 46, in accordance with an embodiment. The industrial automation device 42 may function as a serving device and/or a client device based upon interaction with other devices in the industrial automation control system 10. The automation device 42 may include a processor 48, a memory 50, a communication component 52, and input/output (I/O) components 54. The processor 48, which may be one or more processors, may include any suitable processor or microprocessor capable of executing processor-executable code. The memory 50, which may represent one or more memory components, may be any suitable article of manufacture that can serve as media to store processor-executable code, data, or the like. These articles of manufacture may represent tangible, non-transitory computer-readable media (e.g., any suitable form of tangible memory or storage) that may store processor-executable code (e.g., specialized CIP service 56) used by the processor 48 to perform the presently disclosed techniques. The memory 50 may also be used to store the CIP packets 44 and the payloads encapsulated in the CIP packets 44 when sending responses as a serving device or receiving requests as a client device. The communication component 52 may receive CIP requests from one or more remote clients or send CIP responses to one or more remote clients located externally from the automation device 42 and, thus, the communication component 52 may include a wireless card or a data port (e.g., Ethernet). The communication component 52 may facilitate communication between automation devices 42 using the CIP protocol or other industrial data exchange protocol by enabling the transmission of messages between client and serving devices.

As depicted, the memory 50 may store one or more CIP packets 44. The CIP packets 44 may encapsulate one or more compressed data 46 using a specialized CIP service 56. The specialized CIP service 56 may include computer instructions stored on the memory 50 and executable by the processor 48. In some embodiments, the specialized CIP service 56 may be implemented as firmware included in the automation devices 42. The data 46 that is compressed by a serving device may be referred to as a payload herein and may include one or more services, settings data, HMI data, programming data, process data, control data, among other things. As previously noted, the automation device 42 may function as a client and/or serving device. When functioning as a client device, the specialized CIP service 56 may include functionality for compressing and encapsulating CIP request packets to send to a serving device and functionality for receiving CIP response packets from a serving device, decompressing the CIP response packets or service response payloads, decrypting the payloads if needed, and processing the payloads. For example, the specialized CIP service 56 may compress and encapsulate a CIP service request into the data 46 portion of the CIP packet 44 and a header portion 58 of the CIP packet 44 may include address information of the target serving device as well as session handle information generated when communication between the client and serving devices was initiated, among other things.

When functioning as a serving device, the specialized CIP service 56 may include functionality for receiving CIP request packets from client devices, decompressing CIP request packets or service requests included in the packets, reading the service requests, gathering and compressing desired payloads, securing the payloads if needed, encapsulating the payloads in CIP response packets, compressing and securing the CIP response packets if needed, and sending the CIP response packets to the requesting client devices. Instead of returning various sized chunks (e.g., 500 bytes) of data to requesting clients in numerous exchanges that may delay system responsiveness, the specialized CIP service 56 may enable fewer exchanges between the client and serving devices by locating and gathering the client requested payload into larger sized payload(s) and compressing the payload. The compression ratio may be high due to various data being similar and/or repeated. The types of compression used may include lossless data compression, lossy data compression, among others, depending on the type of data to be compressed and the desired size of the data after compression. Then, the specialized CIP service 56 may encapsulate the compressed payload into the data portion 46 of the CIP packet 44. A CIP header 58 portion of the CIP packet 44 may include information relating to the address of the requesting client and the session handle created when communication between the client and serving devices was initiated, among other things.

Figure 3:
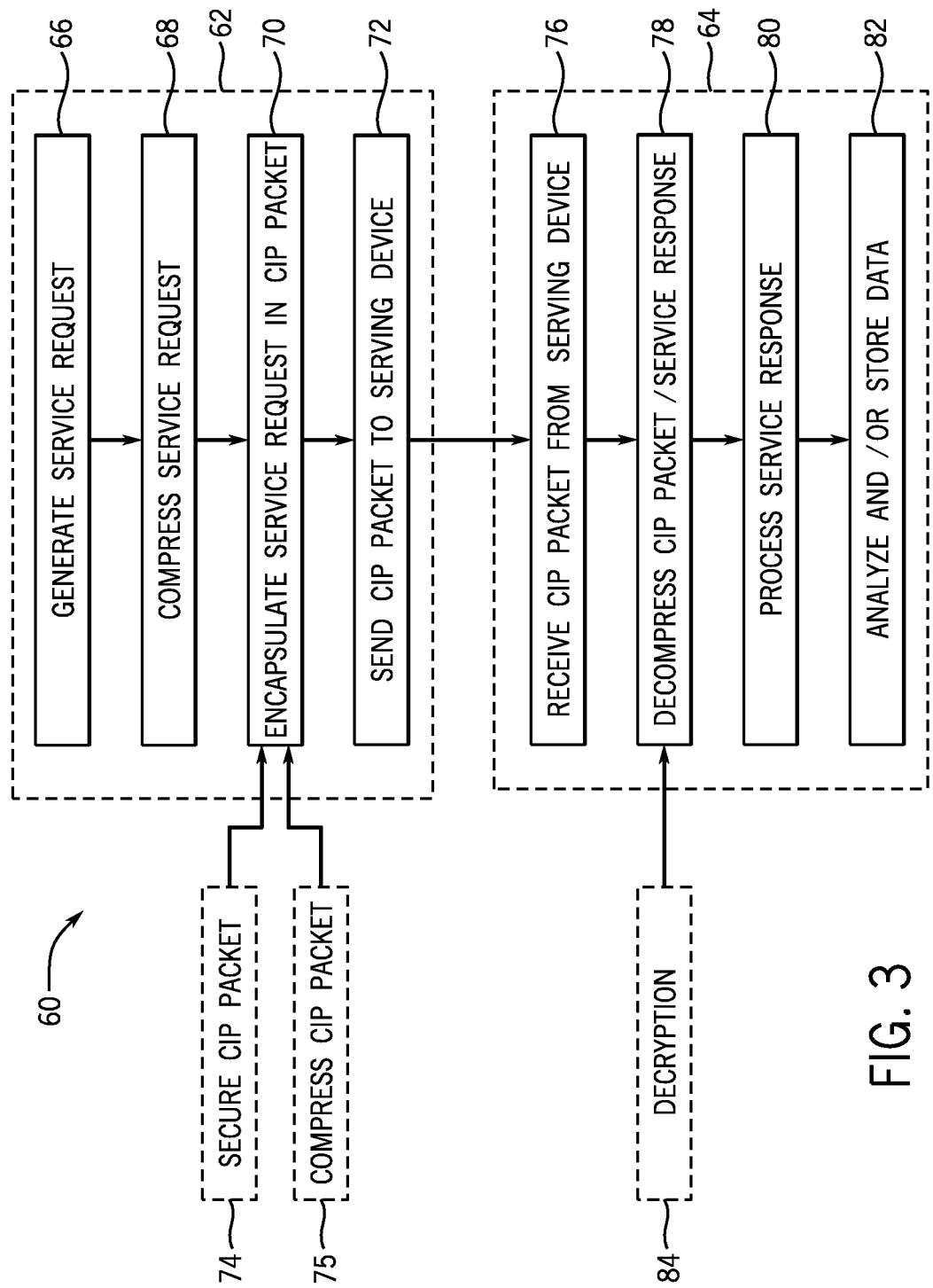
FIG. 3 is a flow diagram of a process suitable for an industrial automation client device to encapsulate a compressed service request in one or more CIP request packets, to receive a response containing one or more CIP response packets, and to process the CIP response packets in accordance with embodiments of the present techniques.

FIG. 3 is a flow diagram of a process 60 suitable for an industrial automation client device to encapsulate a compressed service request in one or more CIP request packets, to receive a response containing one or more CIP response packets, and to process the CIP response packets, in accordance with an embodiment. The process 60 may be implemented with software stored on the memory 50, firmware installed in the automation device, a field-programmable gate array (FPGA), an arduino board, or some combination thereof. The client-side process 60 may generally be split into two phases: a CIP request packet encapsulation phase 62 and a CIP response packet processing phase 64. The CIP request packet encapsulation phase 62 may include generating a service request (process block 66), compressing the service request (process block 68), encapsulating the service request in a CIP packet (process block 70), and sending the CIP packet to a serving device (process block 72), such as a controller.

More specifically, generating the service request (process block 66) for transmission using the CIP protocol may include identifying addressing information for the target serving device and service information that directs the receiving serving device to perform a certain service (e.g., action) on a specific part (e.g., an attribute) of a device. The service request may also include session data related to the connection established between the client and serving devices, and data, if there is any. Then, in process block 68, the client automation device may compress the service request using any suitable compression algorithm. The client automation device may use its specialized CIP service to encapsulate the compressed service request into one or more CIP packets (process block 70). As noted above, the service request may be encapsulated in a data portion of the packet while the addressing and service information may be encapsulated in a header portion of the packet. In some embodiments, the CIP packets may be secured by signature to ensure the data is not altered upon arrival at the serving device, by encryption using public/private key or hashing, by password protection, or some combination thereof (process block 74). Additionally, in some embodiments, the CIP request packets may be compressed using a compression algorithm (process block 75). Next, the client automation device may send the CIP request packets to the serving device over the CIP network (process block 72).

The serving automation device may receive and process the CIP request packets and generate one or more CIP response packets, as will be described in detail below. As a result, the serving automation device may send the CIP response packets back to the requesting client devices. At which point, the process 60 may enter the CIP response packet processing phase 64. This phase 64 may include receiving the CIP response packets from the serving device (process block 76), decompressing the CIP response packets and/or service response payload (process block 78), processing the CIP packet (process block 80), and analyzing and/or storing data in the payload (process block 82). The client device may receive the CIP packets from the serving device (process block 76) and decompress the CIP service response (e.g., payload) and/or CIP response packets (process block 78). In some embodiments, where the serving automation device secured the CIP packet and/or the service response, the client device may unsecure the CIP packet and/or the service response by performing decryption, verifying the signature of the data, entering the associated password, or the like (process block 84). Once decompressed, the payload may be processed by the client by reading the service response (process block 80). Further, the client device may analyze the payload returned in the CIP service response and/or store the payload (process block 82). In some embodiments, the analysis of the payload data may cause the client device to perform further actions. For example, if the client device is itself controlling an upstream process and the payload indicates process parameters returned from the serving device controlling a downstream process that are undesirable, then the client device may issue control instructions to modify actuators, motor drives, and the like in an attempt to modify the downstream parameters.

Figure 4:
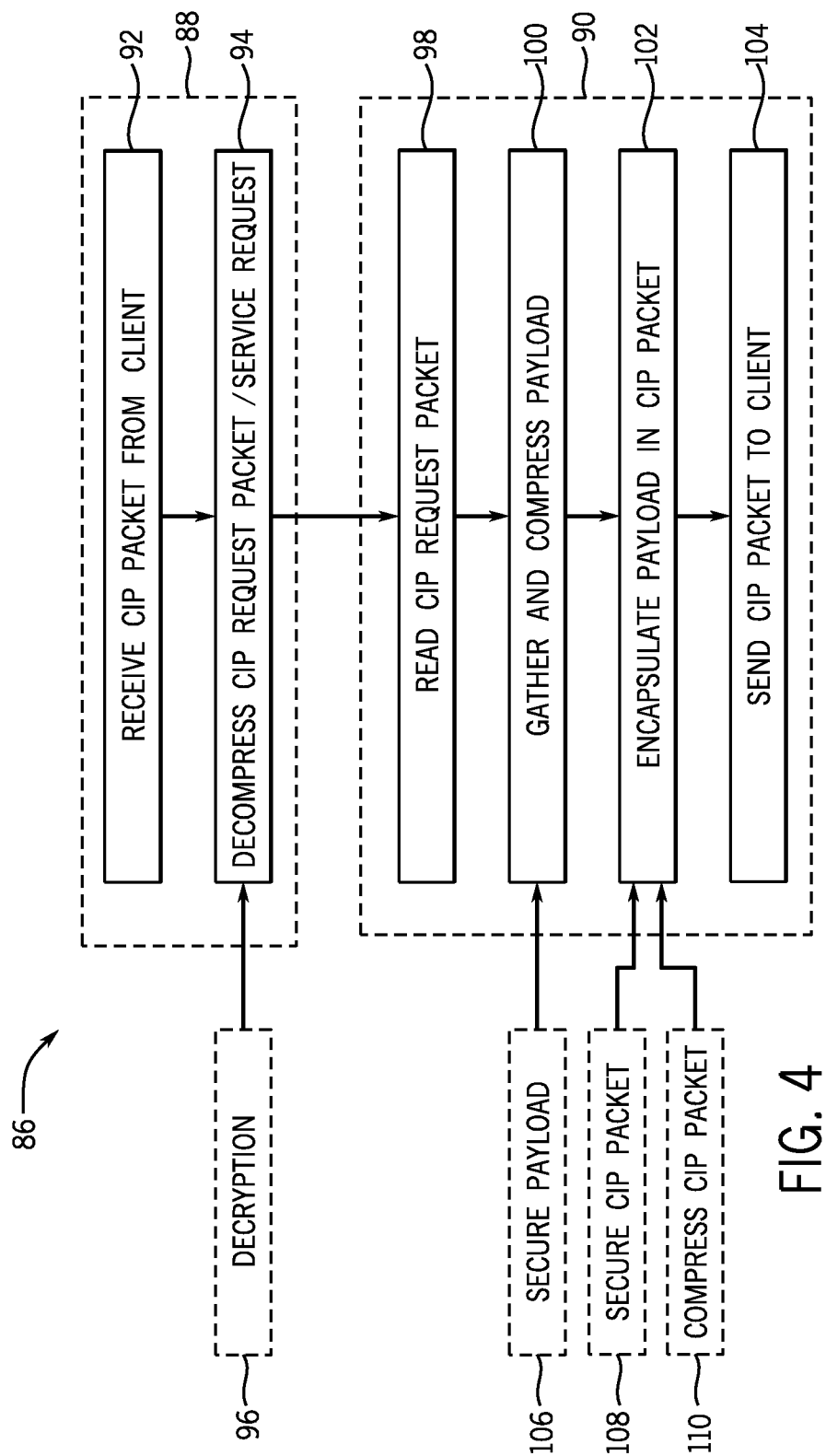
FIG. 4 is a flow diagram of a process suitable for an industrial automation serving device to receive one or more CIP request packets and to compress and encapsulate a desired payload in one or more CIP response packets in accordance with embodiments of the present techniques.

FIG. 4 is a flow diagram of a process 86 suitable for an industrial automation serving device to receive one or more CIP request packets and to compress and encapsulate a desired service response payload in one or more CIP response packets, in accordance with an embodiment. The process 86 may be implemented with software stored on the memory 50, firmware installed in the automation device, a field-programmable gate array (FPGA), an arduino board, or some combination thereof. The server-side process 86 may generally be split into two phases: a CIP request packet processing phase 88 and a CIP response packet encapsulation phase 90.

The CIP request packet processing phase 88 may include receiving one or more CIP request packets from a client (process block 92) and decompressing the CIP request packet and/or the service request (process block 94). More specifically, the serving automation device may receive the CIP request packets from the client (process block 92) and recognize that it contains a CIP service request based on information contained in the CIP header. The CIP request packets may be handled by the specialized CIP service implemented on the serving automation device, which may decompress the service request included in the CIP packet and/or the CIP request packet itself (process block 94). In some embodiments, where the client device secured the packet and/or the service request, the serving automation device may perform decryption using the private/public key or hash value provided, verify the signature of the data, enter the password, or some combination thereof, to access the CIP service request encapsulated in the packet (process block 96). In other embodiments, where the CIP packet was not secured, the serving automation device may directly access the CIP service request without decrypting the packet.

At this point, the server-side process 86 may enter the CIP response packet encapsulation phase 90. This phase 90 may include reading the CIP request packet and service request (process block 98), gathering and compressing a desired payload (e.g. CIP service response) (process block 100), encapsulating the payload in one or more CIP response packets (process block 102), and sending the CIP response packets to the requesting client device (process block 104). Reading the CIP request packet may include determining the CIP service that is requested based on a service code or other identifier (process block 98) and determining the object (e.g., attribute) addressed in the header of the CIP packet. Based on the service that is requested and the addressed object, the specialized CIP service implemented on the serving automation device may gather the response into a single payload and compress the CIP service response payload (process block 100). In some instances, the service response may be gathered into more than one payload based on the size of the data, among other things. Also, in some embodiments, the payload may be secured by signing, encrypting (e.g., public/private key, hashing), password protecting, or some combination thereof (process block 106).

In process block 102, the serving automation device packages the payload by encapsulating it in one or more CIP response packets. As previously mentioned, the CIP header may contain information related to the address of the requesting client, session handle information related to the connection between the client and serving automation device, among other things. The CIP body portion may include the compressed CIP service response (e.g., payload). In some embodiments, the CIP packet may be secured by signing, encrypting (e.g., public/private key, hashing), password protecting, or some combination thereof (process block 108). Also, in some embodiments, the CIP packet itself may be compressed to further reduce the packet size (process block 110). Then, in process block 104, the serving automation device may send the one or more CIP packets to the requesting client device. In an embodiment, the response to the client may be synchronous in that an acknowledgement from the client or other message from the client may be sent back to the server. Synchronous messaging is sometimes used in client/server architectures where requests and responses are transmitted back and forth. In other embodiments, the response to the client may be asynchronous in that the response is a one-way operation, sometimes referred to as "fire and forget," where a message is only sent back to the server upon receipt if a call-back operation is triggered (e.g., by an error or other stimulus). Asynchronous messaging is sometimes used in consumer/producer architecture where the producer broadcasts a multicast message to a plurality of consumers.

The benefits of the disclosed techniques may include a significant reduction in the number of exchanges between an industrial automation client and serving device due to the compressed service requests and service responses using an industry standard open industrial data exchange protocol (e.g., CIP). The reduced file sizes included in the CIP packets may enable faster interaction between the automation client and serving devices, thereby increasing the responsiveness of the system and potentially improving customer satisfaction. Additionally, the smaller packets may free up bandwidth and enable the devices to perform more functionality, handle more requests/responses, and enable a device owner to delay upgrading hardware. Further, using the CIP protocol with the disclosed techniques provides the added benefit of a reliable network supported by the Open DeviceNet Vendor Association (ODVA).

While only certain features of the present techniques have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. An industrial automation system, comprising:
a serving device communicably coupled with a client device via an industrial data exchange protocol;
wherein the client device is configured to determine address information of an attribute of the serving device, determine service information associated with a service to be performed on the attribute of the serving device by the serving device, generate a service request in accordance with the industrial data exchange protocol, compress the service request, encapsulate the compressed service request in a request packet, and send the request packet to the serving device, wherein the request packet comprises the address information and the service information; and
wherein the serving device is configured to receive the request packet, decompress the compressed service request, determine the attribute of the serving device based on the address information, determine the service to be performed on the attribute based on the service information, process the service request by at least performing the service on the attribute, gather a service response payload based on the service request and the service performed on the attribute, compress the service response payload, encapsulate the compressed service response payload into a response packet, and send the response packet to the client device.

2. The system of claim 1, wherein the industrial data exchange protocol is Common Industrial Protocol (CIP).

3. The system of claim 1, wherein the client device is configured to receive the response packet, decompress the compressed service response payload, and process the service response payload.

4. The system of claim 1, wherein the request packet is secured using public key encryption, private key encryption, hashing encryption, a signature, password protection, or some combination thereof.

5. The system of claim 1, wherein the response packet is secured using public key encryption, private key encryption, hashing encryption, a signature, password protection, or some combination thereof.

6. The system of claim 1, wherein a number of exchanges between the client device and the serving device are reduced due to the compressed service request and the compressed service response payload.

7. The system of claim 1, wherein the request packet and the response packet conform to the industrial data exchange protocol.

8. The system of claim 1, wherein the request packet is compressed prior to sending to the serving device and the response packet is compressed prior to sending to the client device.

9. The system of claim 8, wherein the serving device is configured to decompress the request packet and the client device is configured to decompress the response packet.

10. The system of claim 1, wherein a specialized industrial data exchange protocol service implemented on both the client device and the serving device is used to perform at least the compression, decompression, and encapsulation.

11. A non-transitory computer-readable medium storing computer instructions, the computer instructions, when executed by a processor, configured to:
cause an industrial automation device to function as a serving device and receive a request packet conforming to an industrial data exchange protocol containing a compressed service request from an industrial automation client device;
decompress the compressed service request;
determine an attribute of the industrial automation device based on address information of the request packet;
determine a service to be performed on the attribute based on service information of the request packet;
process the service request by at least performing the service on the attribute;
gather a service response payload based on the service request and the service performed on the attribute;
compress the service response payload;
encapsulate the compressed service response payload into a response packet conforming to the industrial data exchange protocol; and
send the response packet to the industrial automation client device.

12. The non-transitory computer-readable medium storing computer instructions of claim 11, wherein the computer instructions, when executed by a processor, are configured to secure the service response payload, the response packet, or some combination thereof by using public key encryption, private key encryption, hashing encryption, a signature, password protection, or some combination thereof.

13. The non-transitory computer-readable medium storing computer instructions of claim 11, wherein the computer instructions, when executed by a processor, are configured to unsecure the request packet, the compressed service request, or some combination thereof by decryption, a signature, a password, or some combination thereof.

14. The non-transitory computer-readable medium storing computer instructions of claim 11, wherein the computer instructions, when executed by a processor, are configured to:
cause the industrial automation device to function as a client device;
determine second address information of a second attribute of an industrial automation serving device;
determine second service information associated with a second service to be performed on the second attribute of the industrial automation serving device by the industrial automation serving device;
generate a service request in accordance with the industrial data exchange protocol;
compress the service request;
encapsulate the compressed service request in a request packet, wherein the request packet comprises the second address information and the second service information; and
send the request packet to the industrial automation serving device via the industrial data exchange protocol.

15. The non-transitory computer-readable medium storing computer instructions of claim 11, wherein the computer instructions, when executed by a processor, are configured to:
reduce the number of exchanges between the industrial automation device and the industrial automation client device.

16. A method for operating an industrial automation device, comprising:
causing the industrial automation device to function as a serving device and receive a request packet conforming to an industrial data exchange protocol containing a compressed service request from an industrial automation client device;
decompressing the compressed service request;
determining an attribute of the industrial automation device based on address information of the request packet;
determining a service to be performed on the attribute based on service information of the request packet;
processing the service request by at least performing the service on the attribute;
gathering a service response payload based on the service request and the service performed on the attribute;
compressing the service response payload;
encapsulating the compressed service response payload into a response packet conforming to the industrial data exchange protocol; and
sending the response packet to the industrial automation client device.

17. The method of claim 16, comprising:
causing the industrial automation device to function as a client device;
determining second address information of a second attribute of an industrial automation serving device;
determine second service information associated with a second service to be performed on the second attribute of the industrial automation serving device by the industrial automation serving device;
generating a service request in accordance with the industrial data exchange protocol;
compressing the service request;
encapsulating the compressed service request in a request packet, wherein the request packet comprises the second address information and the second service information; and
sending the request packet to the industrial automation serving device via the industrial data exchange protocol.

18. The method of claim 16, comprising securing the service response payload, the response packet, or some combination thereof by using public key encryption, private key encryption, hashing encryption, a signature, password protection, or some combination thereof.

19. The method of claim 16, comprising unsecuring the request packet, the compressed service request, or some combination thereof by using decryption, a signature, a password, or some combination thereof.

20. The system of claim 1, wherein:
the client device is configured to initiate communication with the serving device; and
the request packet comprises session handle information generated in response to the communication between the client device and the service device being initiated.

* * * * *